July 12, 1966 S. KOMITOR 3,260,156
PROJECTOR SCREENS HAVING LIGHT REFLECTING ELEMENTS
FORMED INTEGRALLY THEREWITH
Filed March 30, 1964
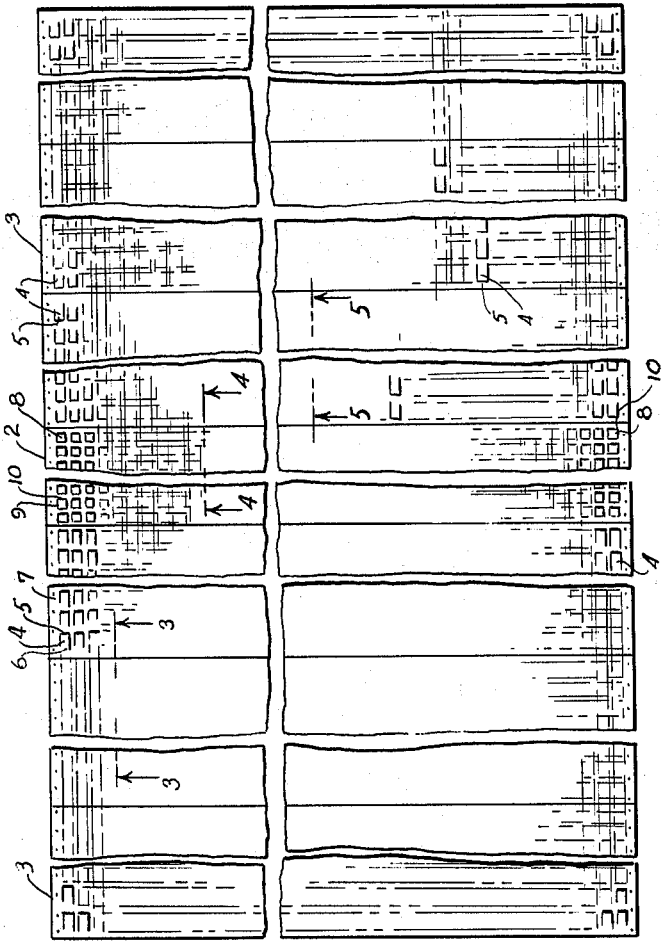
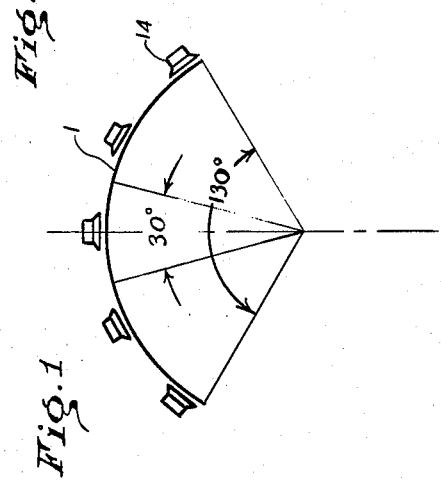
INVENTOR.
SEYMOUR KOMITOR
BY
ATTORNEYS 3,260,156
PROJECTOR SCREENS HAVING LIGHT REFLECTING ELEMENTS FORMED INTEGRALLY THEREWITH
Seymour Komitor, Rockville Centre, N.Y., assignor to Cinerama, Inc., New York, N.Y., a corporation of New York
Filed Mar. 30, 1964, Ser. No. 355,764
3 Claims. (Cl. 88—28.92)

This invention relates to curved projector screens. The problem in the development and use of deep, curved projector screens such as those used in certain processes for the protection of motion pictures has been interscreen reflection wherein light projected onto one portion of the screen is projected or scattered toward another portion of the screen with resultant degradation of the projected image.

Presently, a curved screen such as illustrated in U.S. Patent 2,476,521 is being extensively used to prevent such degradation. Such screens comprise a large number of overlapping vertical, narrow strips of tape angled to reflect light projected on one portion of the screen away from other portions of the screen. The strips are supported under tension by a frame and are perforated to permit transmission of sound from the speaker systems necessarily arranged behind the screen.

Such screens have certain disadvantages such as difficulty of assembly and transportation and flutter of the panels when installed.

In order to overcome certain of these disadvantages, an arrangement such as shown in my co-pending application Serial No. 296,184, filed July 19, 1963, may be utilized in which the screens is formed of a plurality of light reflecting elements mounted on a backing sheet. Each of the elements is a wedge shaped element so that the exposed reflecting surfaces are arranged at an acute angle with respect to the surfaces which are attached to the backing sheet.

This construction, however, requires several sequential operations in the manufacture thereof.

It is, therefore, an object of the present invention to provide an improved curved projection screen consisting of a plurality of light reflecting wedge shaped elements pierced and formed outwardly from the material forming the screen surface.

Another object of the invention is to provide a projector screen composed of a plurality of abutting panels, each panel being formed with reflecting elements on the panel surface, which elements are pierced and formed outwardly from the panel simultaneously to provide light reflecting elements properly oriented with respect to the screen surface and to provide transmission paths for sound transmission through the screen with a minimum of acoustical distortion.

In accordance with these objects, there is provided, in a preferred embodiment of the present invention, a plastic screen composed of a plurality of abutting panels. Each panel is provided with a plurality of light reflecting elements formed by raising incremental elements from the surface of the panel. The formation of each element includes piercing of at least one side of the element to simultaneously eliminate a light reflecting surface adjacent the element and to provide an acoustical path for the transmission of sound through the screen.

At the center of the screen, the light reflecting elements are rectangular in form since the light reflecting therefrom will not degrade the image on other parts of the curved screen.

In the panels forming the sides of the curved screen, the light reflecting elements are wedge shaped. The wedge shaped element is formed with the base of the wedge severed from the panel and oriented so that the severed base is towards the center of the screen.

The spacing between the wedge shaped elements permits the screen to be curved from top to bottom as well as being curved from side to side since the distance between the individual trapezoids will enable free bending of the panels, the edges of the trapezoids closing as the screen is curved without distortion of the reflecting surface thereof.

As such, the screen can be formed with a stamping operation considerably simpler and less costly than the application of striated wedges. The interstices between the individual wedges are open and do not require darkening to prevent the reflection of light therefrom. Similarly, since the interstices are open, transmission paths for the sound from speakers arranged behind the screen are provided without a secondary operation of perforating the screen.

Having briefly described this invention, it will be described in greater detail, along with other objects and advantages thereof, in the following portions of the specification, which may best be understood by reference to the accompanying drawings, of which:

FIG. 1 is a diagrammatic view of a typical installation of a screen constructed in accordance with the present invention;

FIG. 2 is a plan view of a screen in accordance with the present invention, broken away in parts to permit enlargement of details thereof;

FIG. 3 is a sectioned view taken along lines 3—3 in FIG. 2;

FIG. 4 is a sectioned view taken along lines 4—4 in FIG. 2; and

FIG. 5 is a sectioned view taken along lines 5—5 in FIG. 2.

According to the present invention, the screen 1 is formed of a plurality of perforated panels 2 at the center of the screen and perforated panels 3 at the edges of the screen. The panels may, for example, be three feet wide by thirty feet high, secured together at the edges and mounted in a frame structure. The panels may be individually carried in a frame structure. The framing for such screens is identical to framing for present wide screens and, thus, being known is not illustrated.

Each panel is formed of thin sheet material as, for example, an opaque white plastic sheet such as a polyethylene or polyester sheet. The panels forming the sides of the screen are provided with a closely spaced plurality of wedge shaped light reflecting elements 4 pierced and formed from the screen surface. The wedge is formed in the surface after piercing along the base 5. Each of the pierced light reflecting elements is preferably about ¼ in. x ⅜ in. in size spaced approximately ¹⁄₁₆ in. apart. The element is oriented so that the pierced base is toward the center of the screen. The apex 6 and sides 7 of the wedge are integral with the panel material.

Thus, each side of the screen is formed of the panels having rows of wedge shaped light reflecting members and the screen will consist of the segmented wedge shaped striations running from the top to the bottom and lying side by side across the width of the screen. The individual light reflecting members may vary in the angle made with the panel from which pierced, depending on the positioning of the panel with respect to the panel surface, so as to reflect light outwardly towards the audience viewing the picture projected on the screen and preventing reflection of light to other parts of the screen which would degrade the image projected thereon. The angle between the panel and the face of the light reflecting element will normally vary between 3 and 30 degrees.

The screen may be curved both in the horizontal and in the vertical plane. As the screen is curved from top to bottom, the wedge shaped elements will close the space therebetween, thereby enabling a considerable curvature without distortion or deflecting of the surface of each element.

Since the center of the screen will not reflect light to other portions of the screen, the center portion comprises panels 2 having rectangles 8 pierced and formed from the panel material and attached only at the top and bottom sides 9, but pierced at the right and left edges 10 to provide an open side when raised from the panel surface.

Since it is desirable to use lightweight plastic for the material for formation of the panels and since the perforations are closely spaced, the panels themselves will often lack the rigidity and strength necessary for mounting independently. For support, a backing material 12 may be used such as loosely woven backing or fiber glass material to provide the requisite tensile strength. It is also contemplated that the tensile strength may be augmented by the bonding of fiber glass roving to the thin partition between each wedge. It is also, of course, possible to form the panels from fiber glass reinforced plastic material. In the latter case, each panel will have the requisite strength, but at some reduction in the ease of handling and the lightness of each panel.

Since the edges 5, 10 which were pierced during formation of each light reflecting element is open, there will be no reflection between the light reflecting elements and is not necessary to darken the lands between the elements. Similarly, these open spaces permit the transmission of sound from speakers 14 located behind the screen without acoustical distortion.

Thus, there is provided in a simple construction, a screen satisfying the often conflicting requirements of optical and acoustical considerations, which screen can be curved in both horizontal and vertical planes as necessitated by the projection system. The elements will display projected pictures to the audience without reflection of light towards other parts of the screen which might degrade or wash out the picture projected on the other portion. Sound transmission through the screen without distortion is provided by the many paths opened during the formation of the light reflecting elements. The center panels 2 will normally take up from 15–30° of the total screen arc of 130° (usually on a 45 ft. radius).

This invention may be variously modified and embodied within the scope of the subjoined claims.

What is claimed is:
1. A projector screen composed of a plurality of abutting panels, the abutting panels being positioned to form a large screen having a substantially continuous curvature, each of said panels having a surface formed of sheet material and having light reflecting elements pierced from said surface forming material, the light reflecting elements in the panels at the center of said screen being substantially rectangular elements formed from the panel surface forming material and having said material pierced along the sides of the rectangle element and being positioned in protruding disposition by the integral screen material at top and bottom of the rectangle, the light reflecting elements in the panels forming the extension of the screens from the center panels being wedge shaped, each of said elements having the base of said wedge pierced from said screen material and being formed outwardly therefrom with the apex and sides of said wedge integral with said screen material and the base of the wedge protruding outwardly therefrom, each of said elements being positioned with the base of said element toward the center of said screen, the angular inclination of the face of each of said wedge shaped reflecting elements being increased with the separation distance of said panel from the center of said screen so as to reflect the image projected outwardly from the screen and so as to prevent reflection of said image upon other portions of the screen to degrade the image thereon, said pierced openings providing passages for the transmission of sound therethrough.

2. A projector screen in accordance with claim 1 in which said screen describes an arc of 130° and in which said center panels are positioned in an arc ranging from 15–30°.

3. A projector screen in accordance with claim 1 in which the angle between the panel and the surface of said light reflecting element varies between 3° and 30°.

References Cited by the Examiner
UNITED STATES PATENTS

| | | | |
|---|---|---|---|
| 1,710,922 | 4/1929 | De Forest | 88—28.92 |
| 1,880,279 | 10/1932 | Raven | 88—28.92 |
| 2,107,038 | 2/1938 | Lennard | 88—28.92 |
| 2,273,074 | 2/1942 | Waller | 88—28.9 |
| 2,346,257 | 4/1944 | Henn | 88—28.92 |

JULIA E. COINER, *Primary Examiner.*